US008897837B2

(12) United States Patent  (10) Patent No.: US 8,897,837 B2
Song et al.  (45) Date of Patent: Nov. 25, 2014

(54) INTEGRAL COMMUNICATION DEVICE AND CONTROL METHOD THEREOF

(75) Inventors: Hak Hoon Song, Seoul (KR); Sang Geun Hwang, Suwon-si (KR); Kyeong Jun Kim, Yongin-si (KR); Jeng Nam Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 827 days.

(21) Appl. No.: 12/259,082

(22) Filed: Oct. 27, 2008

(65) Prior Publication Data

US 2009/0124288 A1   May 14, 2009

(30) Foreign Application Priority Data

Nov. 13, 2007  (KR) ........................ 10-2007-0115261

(51) Int. Cl.
*H04M 1/00* (2006.01)
*H04M 1/02* (2006.01)
(52) U.S. Cl.
CPC .................................. *H04M 1/0254* (2013.01)
USPC ......................... 455/558; 455/552.1; 455/557
(58) Field of Classification Search
CPC ...... H04B 1/3816; H04B 1/0458; H04B 1/18; H04B 1/3883; H04B 1/38; H04W 88/02; H04W 52/028; H04W 52/0296
USPC ............... 455/558, 41.2, 552.1, 557, 463, 78, 455/432.1, 453.1, 456.1, 423, 434, 572; 361/679.55; 375/220, 222
See application file for complete search history.

(56) References Cited

U.S. PATENT DOCUMENTS

| 6,784,748 | B1 * | 8/2004 | Canyon et al. ................. 330/296 |
| 7,117,013 | B2 * | 10/2006 | Cromer et al. ................ 455/558 |
| 7,319,715 | B1 * | 1/2008 | Souissi et al. ................. 375/220 |
| 2002/0198024 | A1 * | 12/2002 | Sakurai ......................... 455/558 |
| 2004/0033812 | A1 * | 2/2004 | Matsunaga et al. ........... 455/557 |
| 2004/0198420 | A1 * | 10/2004 | He et al. ...................... 455/552.1 |
| 2004/0204091 | A1 * | 10/2004 | Liu et al. ........................ 455/558 |
| 2005/0085264 | A1 * | 4/2005 | Matsumura ................... 455/558 |
| 2006/0063560 | A1 * | 3/2006 | Herle .......................... 455/552.1 |
| 2006/0136758 | A1 * | 6/2006 | Yoon .............................. 713/300 |
| 2006/0172769 | A1 * | 8/2006 | Oh ................................ 455/557 |
| 2006/0183501 | A1 * | 8/2006 | Egoshi et al. ................. 455/558 |
| 2007/0004402 | A1 * | 1/2007 | Buckley ...................... 455/432.1 |
| 2007/0120531 | A1 * | 5/2007 | Huh .............................. 320/130 |
| 2007/0153723 | A1 |  | 7/2007 | Souissi et al. |
| 2007/0207798 | A1 * | 9/2007 | Talozi et al. .................. 455/423 |
| 2007/0298714 | A1 * | 12/2007 | Chiu ............................ 455/41.2 |

* cited by examiner

*Primary Examiner* — Golam Sorowar
(74) *Attorney, Agent, or Firm* — Jefferson IP Law, LLP

(57) ABSTRACT

An integral communication device and method for controlling the integral communication device are provided for expanding the communication capability of a mobile terminal. An integral communication device of the present invention includes a plurality of communication modules that operate with different communication standards, a connector having terminals for electrical connection to a mobile terminal, a switch for switching the terminals of the connector between the communication modules, and a device controller for controlling the switch to establish electric links to the communication modules individually.

18 Claims, 6 Drawing Sheets

FIG. 7

| | A1 | B1 | B2 | C1 | C2 |
|---|---|---|---|---|---|
| FIRST COMMUNICATION MODULE | H | L | | | H |
| SECOND COMMUNICATION MODULE | L | | H | | H |
| SW4 | H | L | | | H |
| SW5 | H | L | | | H |
| SW6 | L | H | | | H |
| SW7 | H | L | | | H |

INTEGRAL COMMUNICATION DEVICE AND CONTROL METHOD THEREOF

CLAIMS OF PRIORITY

This application claims the benefit under 35 U.S.C. §119(a) of a Korean patent application filed in the Korean Intellectual Property Office on Nov. 13, 2007 and assigned Serial No. 2007-0115261, the entire disclosure of which is hereby incorporated by reference.

BACKGROUND OF THE INVENTION

1. Field of the Invention

The present invention relates to a mobile communication terminal. More particularly, the present invention relates to an integral communication device for expanding communication capability of a mobile terminal and a method for controlling the integral communication device that is capable of controlling operations of multiple communication modules constituting the integral communication device efficiently.

2. Description of the Related Art

Earlier mobile terminals had a large and heavy design in order to stabilize the battery and other internal components. However, the bulk of these terminals was so great as to make it nearly unsuitable to call them "portable." With the advance of semiconductor and battery technologies, mobile terminals have become slim and compact in design.

With improvements in their portability and the diversification of available applications, the use of mobile devices increased dramatically. The popularity of mobile communication terminals (including mobile phones) is further increasing due to the increased number of subscription services that are available for providing various useful functions as well as the mobile communication functionality of such terminals.

As the demand and availability of useful functions are increasing, users are also demanding external connection interfaces to support the various functions. Accordingly, most of recently manufactured mobile devices are provided with at least one external connection interface. For example, a mobile terminal is provided with a Universal Serial Bus (USB) port for supporting connection to a USB-enabled storage medium so as to overcome the limit of internal storage capacity. Moreover, most of the recently manufactured mobile terminals provide at least one of various communication interfaces for establishing a wireless or wired connection link with an external device.

Also, as the kinds of peripheral devices of the mobile terminal are diversified, it has been required for the mobile terminal to support simultaneous connections to multiple peripheral devices. However, because the mobile terminal is limited in size, there is not enough area to provide multiple connection interfaces. Accordingly, there is a need to develop a multiple devices connection mechanism and control method for establishing simultaneous connections to multiple devices and managing the multiple connections efficiently.

SUMMARY OF THE INVENTION

An aspect of the present invention is to address at least the above-mentioned problems and/or disadvantages and to provide at least the advantages described below. Accordingly, an aspect of the present invention is to provide an integral communication device and control method thereof that is capable of establishing simultaneous connections to multiple devices and controlling the multiple connections efficiently, thereby improving power consumption efficiency of the mobile terminal and operability of the communication modules.

In accordance with an aspect of the present invention, an integral communication device is provided. The device includes a plurality of communication modules that operate with different communication standards, a connector having terminals for electrical connection to a mobile terminal, a switch for switching the terminals of the connector between the communication modules, and a device controller for controlling the switch to establish electric links to the communication modules individually.

In accordance with another aspect of the present invention, a method for controlling an integral communication device having multiple communication modules is provided. The method includes establishing an electrical connection to an external device, establishing at least one signal line and at least one power line between a primary communication module, set as a default communication module among communication modules in the external device, and a mobile terminal, and establishing a power line between a secondary communication module and the mobile terminal for supplying power from the mobile terminal to the secondary communication module.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 7 is a timing diagram illustrating operation timings of the integral communication device of FIG. 6.

Throughout the drawings, it should be noted that like reference numbers are used to depict the same or similar elements, features and structures.

DETAILED DESCRIPTION OF EXEMPLARY EMBODIMENTS

Figure 1:
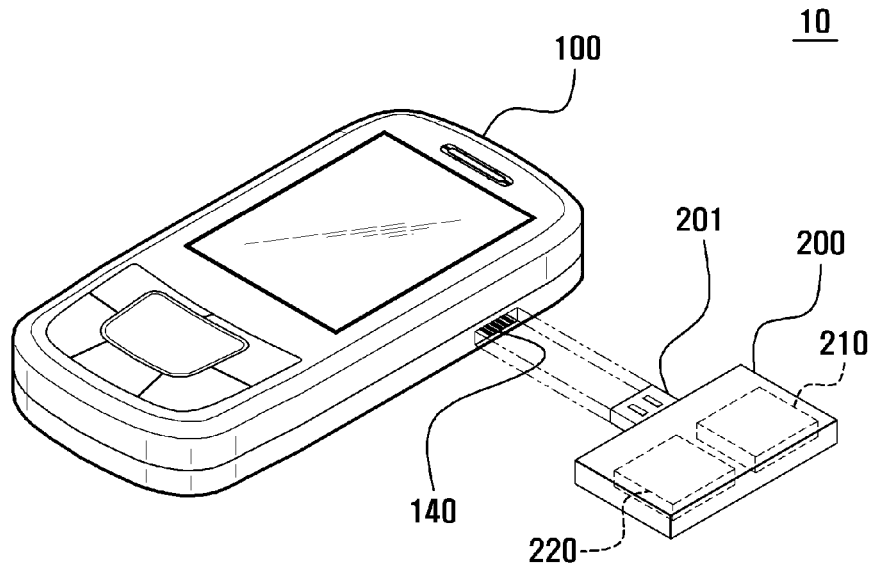
FIG. 1 is a schematic diagram illustrating an integral device control system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is also to be understood that the singular forms "a," "an," and "the" include plural referents unless the context clearly dictates otherwise. Thus, for example, reference to "a component surface" includes reference to one or more of such surfaces.

In the following description, it is assumed that the integral communication device is equipped with a Wireless Broadband (WiBro) module as a first communication module and a High Speed Downlink Packet Access (HSDPA) module as a second communication module. However, it is to be understood that the present invention is not limited there to. For example, the integral communication device of the present invention can be implemented using a Worldwide Interoperability for Microwave Access (WiMAX) module, a Bluetooth module, a Wideband Code Division Multiple Access (WCDMA), a Wireless Fidelity (Wi-Fi) module, and their equivalent communication standard modules, supporting USB connection. Also, each communication module can be implemented as a communication interface for establishing a communication link with an external device such as a mobile terminal or a storage device.

In the following description, the mobile terminal to which the integral communication device is connected can be any of a cellular phone, a laptop computer, a portable game console and the like. However, the present invention is not limited thereto. For example, the integral communication device can be applied to fixed terminals such as a desktop computer and a fixed game console.

Furthermore, although the mobile terminal to which the integral communication device is connected is depicted as a wireless communication device having a radio frequency unit, the present invention is not limited thereto. For example, the mobile terminal can be any of electric devices having a communication interface corresponding to that of the integral communication device and supporting communication with the integral communication device.

Before explaining an exemplary integral communication device and control method thereof, an exemplary integral device control system composed of a mobile terminal and an integral communication device is described with reference to FIG. 1.

FIG. 1 is a schematic diagram illustrating an integral device control system according to an exemplary embodiment of the present invention.

Referring to FIG. 1, the integral device control system includes an integral communication device 200 having two communication modules 210 and 220 and a mobile terminal 100 which, when the integral communication device 200 is connected thereto, controls the communication modules 210 and 220. As will be explained in more detail below, the integral communication device includes a connector 201 and the mobile terminal 100 includes an external connection interface 140 designed for physical and electrical connection thereto. The mobile terminal 100 can be configured such that, when the integral communication device 200 is connected thereto, a communication link is established with one of the two communication modules 210 and 220 of the communication device 200 as a default communication module. After establishing a default communication link with one of the communication modules 210 and 220, the other communication module may be activated to collect information associated with the communication module, such as radio environment information, according to a preset control sequence of the mobile terminal 100. In this integral device control system, the first and second communication modules 210 and 220 of the integral communication device 200 are controlled by the mobile terminal 100 individually. Structures and functions of the mobile terminal 100 and the integral communication device 200 are described in more detail below with reference to the drawings.

Figure 2:
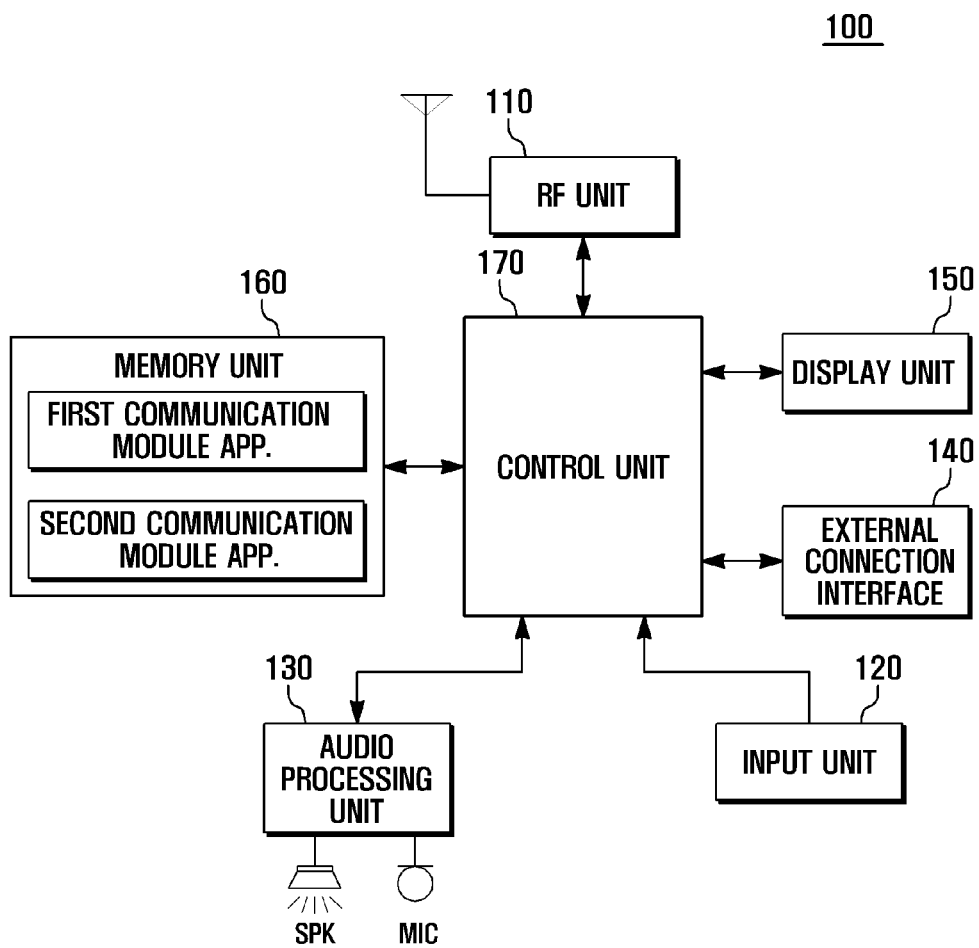
FIG. 2 is a block diagram illustrating a configuration of a mobile terminal according to an exemplary embodiment of the present invention.

FIG. 2 is a block diagram illustrating a configuration of a mobile terminal according to an exemplary embodiment of the present invention. In this exemplary embodiment, the mobile terminal is assumed to be a mobile phone.

Referring to FIG. 2, the mobile terminal 100 includes a Radio Frequency (RF) unit 110, an input unit 120, an audio processing unit 130, an external connection interface 140, a display unit 150, a memory unit 160, and a control unit 170. Once the integral communication device 200 is connected to the mobile terminal through the external connection interface 140, the mobile terminal 100 controls to activate at least one of the first and second communication modules 210 and 220 and provides the user with information on the functions supported by the activated first and second communication modules 210 and 220. At this time, the mobile terminal 100 controls the first and second communication modules 210 and 220 individually by means of a switching mechanism interposed therebetween. For example, the switching mechanism can be configured such that one of the communication modules has its communication link with the mobile terminal 100 switched on and off while the other maintains the communication link with the mobile terminal 100. This operation will be explained in more detail below.

The RF unit 110 is responsible for establishing a radio communication channel for carrying signals associated with communication services such as voice and data communication services such as Short Messaging Service (SMS) and Multimedia Messaging Service (MMS). The RF unit 110 superimposes the voice/data and control signals to be transmitted on the radio frequency and extracts voice/data and control signals from the radio frequency. For these purposes, the RF unit 110 includes an RF transmitter for up-converting and amplifying a transmission signal and an RF receiver for low noise amplifying and down-converting a reception signal. The RF unit 110 can be configured to be activated and deactivated according to the operation of the integral communication device 200 connected through the external connection interface 140. That is, when the mobile terminal 100 operates in a communication mode supported by the integral communication module 200, the RF unit 110 can be controlled to be deactivated under the control of the control unit 170 or according to a user command.

The input unit 120 is provided with a plurality of alphanumeric keys for receiving alphanumeric data and function keys for configuring and executing various functions of the mobile terminal 100. The function keys can be implemented in the form of separately installed navigation keys, side keys and shortcut keys. The input unit 120 generates a key sequence in response to a user input and transmits the key sequence to the control unit 170. In an exemplary embodiment, the input unit 120 is configured such that, when the integral communication device 200 is connected to the mobile terminal 100, it generates key sequences corresponding to user commands for selecting one of the communication modules 210 and 220 of the integral communication device 200, requesting access to a specific communication service with the selected communication module, terminating the communication service and the like.

The audio processing unit 130 processes audio signals input through the RF unit 110 or the integral communication device 200 and outputs the processed audio signal through a speaker (SPK) in the form of an audible sound wave. The audio processing unit 130 also processes sound waves input through a microphone (MIC) and outputs the processed sound wave to the control unit 170 in the form of an audio signal. In an exemplary embodiment, the audio processing unit 130 can be configured to generate alert sounds for alerting of the connection or disconnection of the integral communication device 200.

The external connection interface 140 can be implemented with any of various electrical connection interfaces such as USB, plug and socket, jack connectors and the like. In an exemplary embodiment, the external connection interface 140 is implemented with a USB connector. The external interface 140 is configured to deliver both power and data to the integral communication device 200. In an exemplary embodiment, the external connection interface 140 is implemented with a USB connector corresponding to a connector of the integral communication module 200 so as to establish power, ground, and first and second data lines.

The display unit 150 is configured to display application screens associated with the activations of the RF unit 110 and the integral communication device 200, data input by the user, and other supplementary function screens. The display unit 150 also displays terminal operation screens such as idle mode screen, menu screen, and video playback screen. The display unit 150 can be implemented with a Liquid Crystal Display (LCD). When implemented with an LCD supporting touchscreen functionality, the display unit 150 can work as a part of the input unit 120. The display unit 150 also can be configured to display a message for alerting of the connection of the integral communication device 200 in the form of text or an icon. The display unit 150 may also display a list of the communication modules 210 and 220 provided by the integral communication device 200 under the control of the control unit 170. The display unit 150 also can be configured to display a series of processes for activating the communication module selected by the user. The display unit 150 can be configured to display the radio environmental information such as the received signal strength in the form of a text message or indication icon. The display unit 150 may also display a message for alerting of the disconnection of the integral communication device 200 from the external connection interface 140 in the form of a text or an icon. In an exemplary embodiment, the alert text or icon is displayed temporarily.

The memory unit 160 stores an operation system and application programs for executing various supplementary functions of the mobile terminal such as a file playback function, a camera function, a broadcast playback function and the like. The memory unit 160 also stores data generated while the application programs operate as well as data received through a communication channel. The memory unit 160 may be partitioned into a program memory region and a data memory region.

In an exemplary embodiment, the program memory region stores the various application programs, particularly application programs for activating and managing the operation of the integral communication device 200. In a case that the integral communication device 200 is provided with a WiBro module as the first communication module 210 and an HSDPA module as the second communication module 220, the WiBro and HSDPA application programs are stored in the program memory region. The application programs can be downloaded from the integral communication device 200 and stored in the application memory region.

The data memory region stores user data such as a phonebook, a schedule, a memo, message data that are produced by corresponding application programs and the like. For example, when the application programs for operating the first and second communication modules 210 and 220 are executed, the data memory region stores data exchanged through the communication channels established between the mobile terminal 100 and the communication modules 210 and 220.

The control unit 170 controls general operations and signaling among internal components of the mobile terminal 100. The control unit 170 detects a device attachment at the external connection interface 140, recognizes the integral communication device 220, and controls to display the list of the communication modules. The control unit 170 generates a control signal in response to a user command input through the input unit 120 and transmits the control signal to the integral communication device 200 such that the integral communication device 200 activates one of the communication modules based on the control signal. Here, the communication modules 210 and 220 of the integral communication device 200 can be activated simultaneously or selectively according to the control signal. The integral communication device control operation of the control unit 170 is described in more detail later.

As described above, the mobile terminal 100 recognizes the integral communication device 200 connected through the external connection interface 140, displays the list of the communication modules provided by the integral communication device 200, and activates, when one of the communication modules is selected from the list, the application program for executing the selected communication module. By controlling the activations of the communication modules individually, the mobile terminal 100 can manage the power supply to the respective communication modules, resulting in stable and efficient power consumption. A more detailed description of the power control is provided below with the explanation of the integral communication device.

Figure 3:
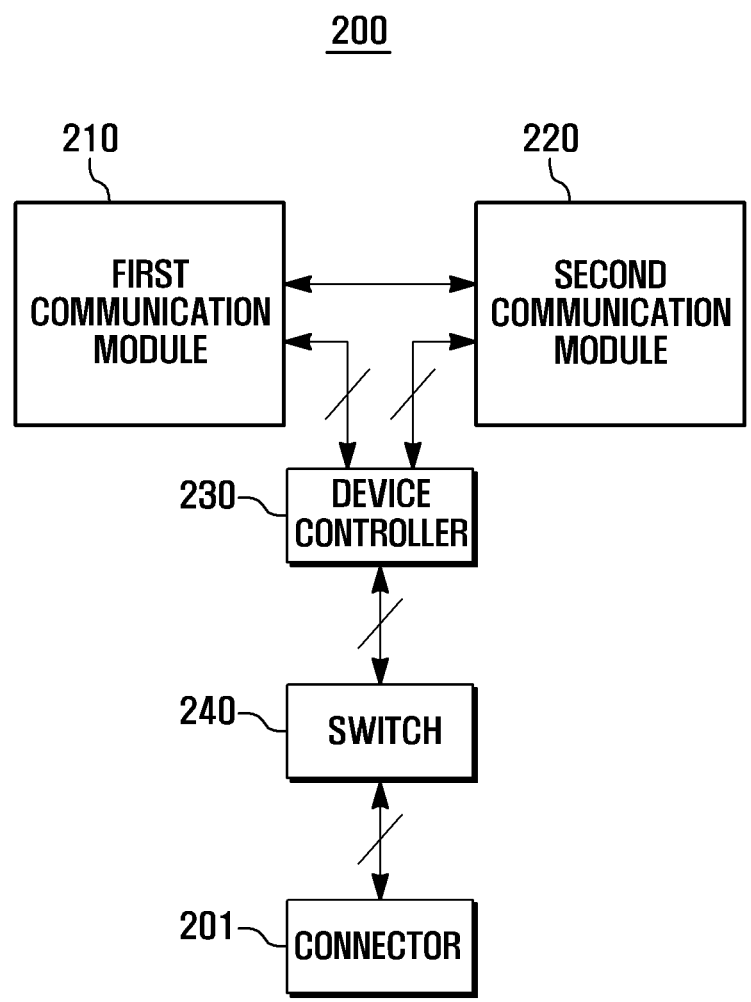
FIG. 3 is a diagram illustrating an integral communication device according to an exemplary embodiment of the present invention.

FIG. 3 is a diagram illustrating an integral communication device according to an exemplary embodiment of the present invention. In this exemplary embodiment, the integral communication device 200 is provided with two communication modules: a first communication module 210 and a second communication module 220. In the illustrated example, the first communication module 210 is a WiBro module, and the second communication module 220 is an HSDPA module.

Referring to FIG. 3, the integral communication device 200 includes the first communication module 210, the second communication module 220, a device controller 230, a switch 240, and a connector 201.

The connector 201 is a component for providing an electrical and physical interface with the external connection interface 140 of the mobile terminal. Accordingly, the connector 201 is provided with one or more electric terminals for electrical connection to corresponding electric terminals of the mobile terminal. For example, the electric terminals of the connector 201 may be electrically connected to electric pins of the external connection interface 140 of the mobile terminal. More specifically, the connector 201 may be provided with electric terminals for establishing a connection for a signal line, a power line and a ground line.

The first communication module 210 is a component for supporting a specific communication service (in this example, a WiBro service). The first communication module 210 stores a WiBro application program and delivers the WiBro application program to the mobile terminal 100 when it is connected to the mobile terminal 100. The first communication module 210 is provided with an interface for accessing the mobile terminal 100 via the device controller 230, switch 240, and connector 201. The first communication module 210 may include internal components for executing the WiBro application program independently. For example, the first communication module 210 may include an Input/Output (I/O) bus, a memory such as Read-Only Memory (ROM) and Random Access Memory (RAM) connected to the I/O bus and storing the OS and WiBro application program, a control processor for controlling exchange of signals for booting up the first communication module 210 and supporting the WiBro service, and a WiBro antenna.

The second communication module 220 is a component for supporting another communication service (in this example, an HSDPA service). The second communication module 220 stores an HSDPA application program and delivers the HSDPA application program to the mobile terminal 100 when it is connected to the mobile terminal 100. The second communication module is provided with an interface for accessing the mobile terminal 100 via the device controller 230, switch 240, and connector 201. The second communication module 220 may include internal components for executing the HSDPA program independently. For example, the second communication module 220 may include an Input/Output (I/O) bus, a memory such as ROM and RAM connected to the I/O bus and storing the OS and WiBro application program, a control processor for controlling exchange of signals for booting up the second communication module 220 and supporting the HSDPA service, and an HSDPA antenna.

The first and second communication modules 210 and 220 are connected through a signal line such that the first and second communication modules 210 and 220 exchange information with each other. The information exchange between the first and second communication modules 210 and 220 can be performed using a Serial Peripheral Interface (SPI), a Universal Asynchronous Receiver Transmitter (UART), and USB On-The-Go (USB OTG) communications between the control processors of the communication modules 210 and 220.

As will be explained in more detail below, when one of the communication modules 210 and 220 is activated, the device controller 230 configures signal and power lines according to the control signal received from the mobile terminal 100. The device controller 230 is disposed between the switch 240 and the first and second communication modules 210 and 220. The device controller 230 is provided with signal lines and power lines for exchanging signals with and supplying power to the respective first and second communication modules 210 and 220 and the switch 240. The switch 240 is controlled based on the control signal received from the device controller 230.

When the integral communication device 200 is connected to the mobile terminal 100, the device controller 230 of the integral communication device 200 establishes a connection between a default communication module and the mobile terminal 100 so as to operate in a default communication mode. In this case, the device controller 230 activates one of the first and second communication modules 210 and 220 as the default communication module according to a control signal received from the mobile terminal 100. The device controller 230 also controls to establish and release the communication links to the respective first and second communication modules 210 and 220 according to a control signal received from the mobile terminal 100.

The device controller 230 can be configured such that, when the integral communication device 200 connects to the mobile terminal 100, a default communication module of the integral communication device 200 is activated in a default communication mode to communicate with the mobile terminal 100 automatically. In the default communication mode, the device controller 230 controls the activation/deactivation of the communication modules 210 and 220 independently according to the control signal received from the mobile terminal 100. Since the device controller 230 controls only switching lines to the communication modules 210 and 220, the functionality of communication device 200 can be implemented simply.

The switch 240 is disposed between the connector 201 and the device controller 230. The switch 240 switches the connection of signal and power terminals of the connector 201, connected to the external connection interface 140 of the mobile terminal 100, between the signal and power lines of the communication modules 210 and 220.

With this configuration, the device controller 230 of the integral communication device 200 activates the first and second communication modules simultaneously or individually by controlling the switch 240 in response to the control signal received from the mobile terminal 100.

Exemplary circuit configurations of an integral communication device 200 for a simultaneous operation mode and an independent operation mode of the communication modules are described in more detail hereinafter.

Figure 4:
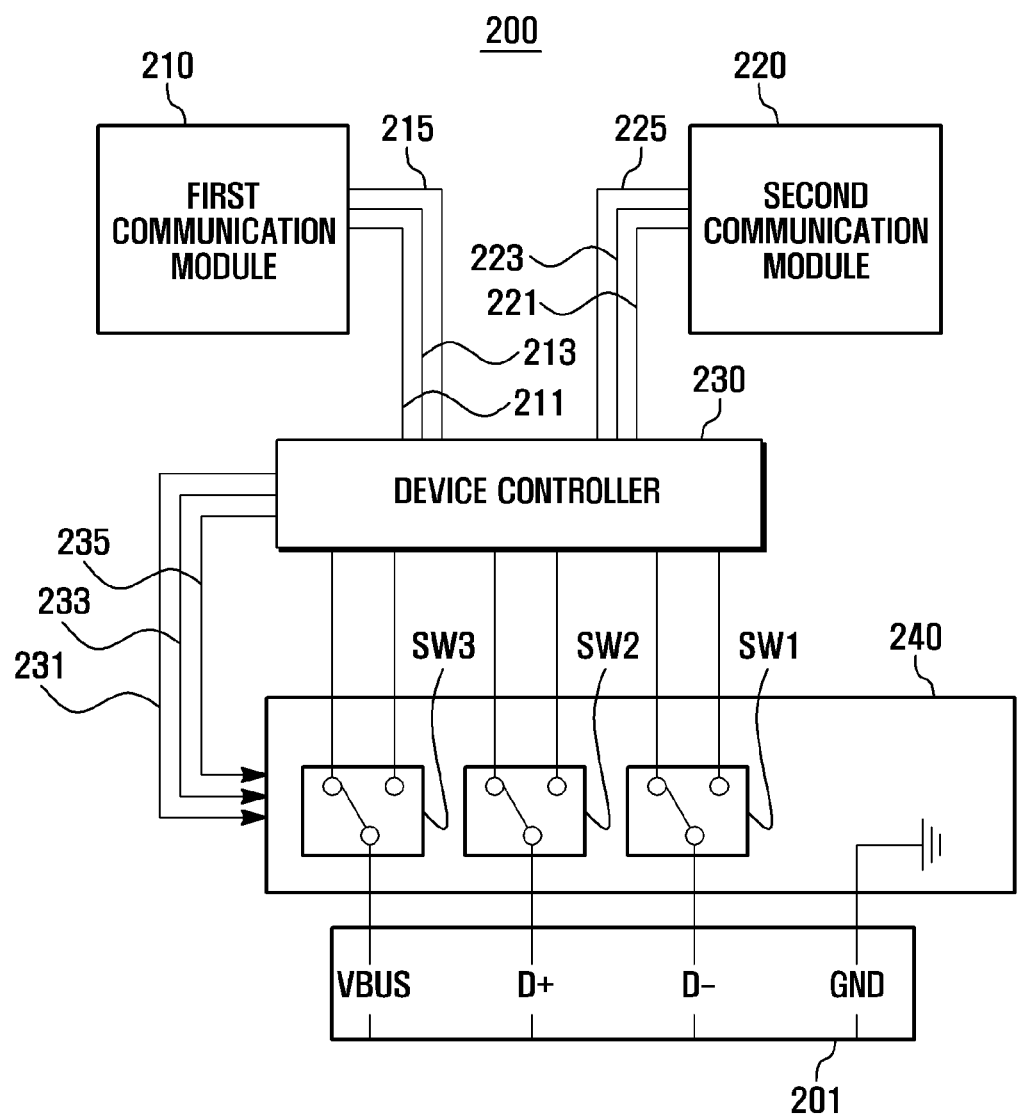
FIG. 4 is a circuit diagram illustrating an independent operation mode of an integral communication device according to an exemplary embodiment of the present invention.

FIG. 4 is a circuit diagram illustrating an independent operation mode of an integral communication device according to an exemplary embodiment of the present invention.

Referring to FIG. 4, an integral communication device 200 configured for an independent operation mode includes a first communication module 210, a second communication module 220, a device controller 230, a switch 240, and a connector 201. The integral communication device 200 further includes a first set of lines 211, 213, and 215 connecting the device controller 230 and the first communication module 210, a second set of lines 221, 223, and 225 connecting the device controller 230 and the second communication module 220, and a third set of lines 231, 233, and 235 connecting the device controller 230 and the switch 240. Here, the switch 240 includes a first switch unit (SW1) of which one terminal is connected to a first signal terminal (D−), a second switch unit (SW2) of which one terminal is connected to a second signal terminal (D+), and a third switch unit (SW3) of which one terminal is connected to a power terminal (VBUS). Preferably, the switch 240 is provided with a ground terminal (GND). The third set of lines 231, 233, and 235 is provided for transporting control and/or power signals output by the device controller 230 to the switch units SW1, SW2, and SW3. The first set of lines 211, 213, and 215 and the second set of lines 221, 223, and 225 are connected to the power terminal (VBUS), the first signal terminal (D−), and the second signal terminal (D+) selectively by means of the switch units SW1, SW2, and SW3 under the control of the device controller 230. In this exemplary embodiment, the switch units SW1, SW2, and SW3 are switching the power terminal (VBUS), the first signal terminal (D−), and the second signal terminal (D+) to the corresponding power and signal lines 211, 213, and 215 of the first communication module 210.

The switch 240 switches the power terminal (VBUS), the first signal terminal (D−), and the second signal terminal (D+) to the corresponding power and signal lines 221, 223, and 225 of the second communication module 220 according to a control signal output by the device controller 230. An exemplary independent operation mode of the integral communication device is described in more detail with reference to FIG. 5.

Figure 5:
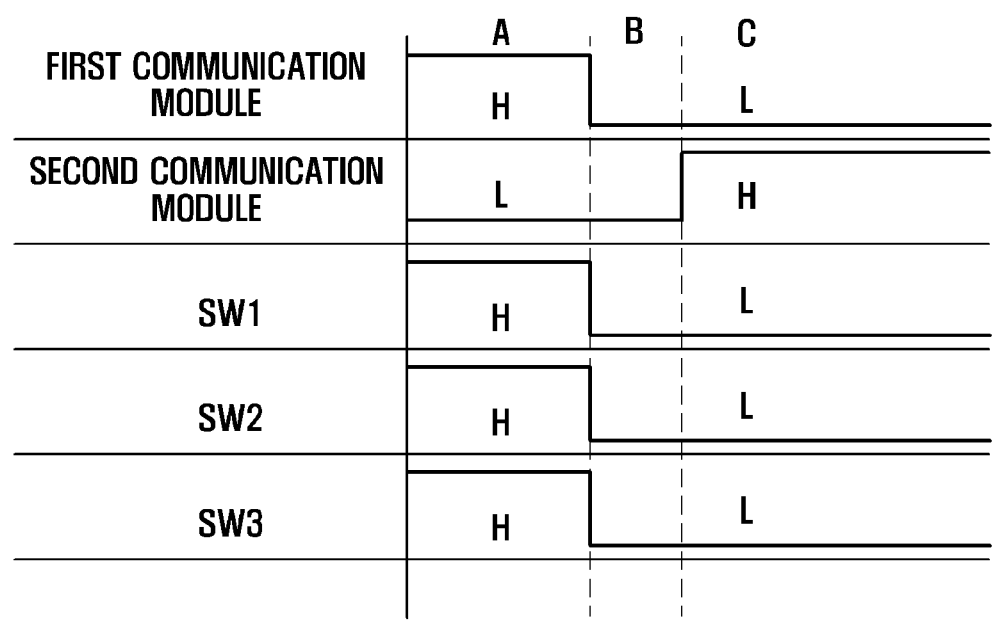
FIG. 5 is a timing diagram illustrating operation timings of the integral communication device of FIG. 4.

FIG. 5 is a timing diagram illustrating an exemplary operation timing of the integral communication device of FIG. 4.

Referring to FIG. 5, when the integral communication device 200 is connected to the mobile terminal 100, the mobile terminal 100 supplies power to the first communication module 210 as a default communication module of the integral communication device 200. In period A, the integral communication device 200 operates in a default mode in which the first to third switch units SW1, SW2, and SW3 of the switch 240 are in a high state (H) such that the terminals D−, D+, and VBUS of the connector 201 are connected to the first set of lines 211, 213, and 215. In the high state "H", the switch 240 connects the terminals D−, D+, and VBUS of the connector 201 to the first set of lines 211, 213, and 215. That is, regardless of the feature or power level supplied to the first to third switch units SW1, SW2, and SW3, the first to third switch units SW1, SW2, and SW3 of the switch 240 operate to switch the terminals D−, D+, and VBUS of the connector 201 to the signal and power lines of the first communication module 210.

The first communication module 210 boots up with the power supplied by the mobile terminal 100 and is maintained in the high state "H". In the high state "H", the first communication module 210 is activated to communicate with the mobile terminal 100. At this time, the second communication module 220 maintains a low state "L" in which no power is supplied thereto. In the low state "L", the second communication module 220 is deactivated.

In period B, the first to third switch units SW1, SW2, and SW3 are turned to a low state "L". The state change of the switch 240 occurs when the device controller 230 receives a control signal from the mobile terminal 100 for activating the second communication module 220. When the switch 240 is in the low state "L", the first to third switch units SW1, SW2, and SW3 connect the terminals D−, D+, and VBUS of the connector 201 to the second set of lines 221, 223, and 225. That is, if a control signal for activating the second communication module 220 is received, the device controller 230 outputs a signal value to the third set of lines 231, 233, and 235 for changing the states of the first to third switch units SW1 to SW3. Accordingly, the switch 240 connects the terminals D−, D+, and VBUS of the connector 201 to the second set of lines 221, 223, and 225 of the second communication module 220. At this time, the power terminal (VBUS) of the connector 201 is shorted with the power line of the first communication module 210 such that the first communication module 210 is deactivated. In contrast, the power line of the second communication module 220 is connected to the power terminal (VBUS) of the connector 201 such that the power from the mobile terminal 100 is supplied to the second communication module 220, whereby the second communication module 220 boots up in period B.

In period C, the first to third switch units SW1, SW2, and SW3 each maintains its low state "L". In this case, the power of the mobile terminal 100 is supplied to the second communication module 220 such that the second communication module 220 is booted up and activated. Since the power supply to the first communication module 210 is disconnected, the first communication module 210 is deactivated.

As described above, an exemplary integral communication device 200 is configured such that the device controller 230 controls the switch units for activating the first and second communication modules 210 and 220 selectively.

Figure 6:
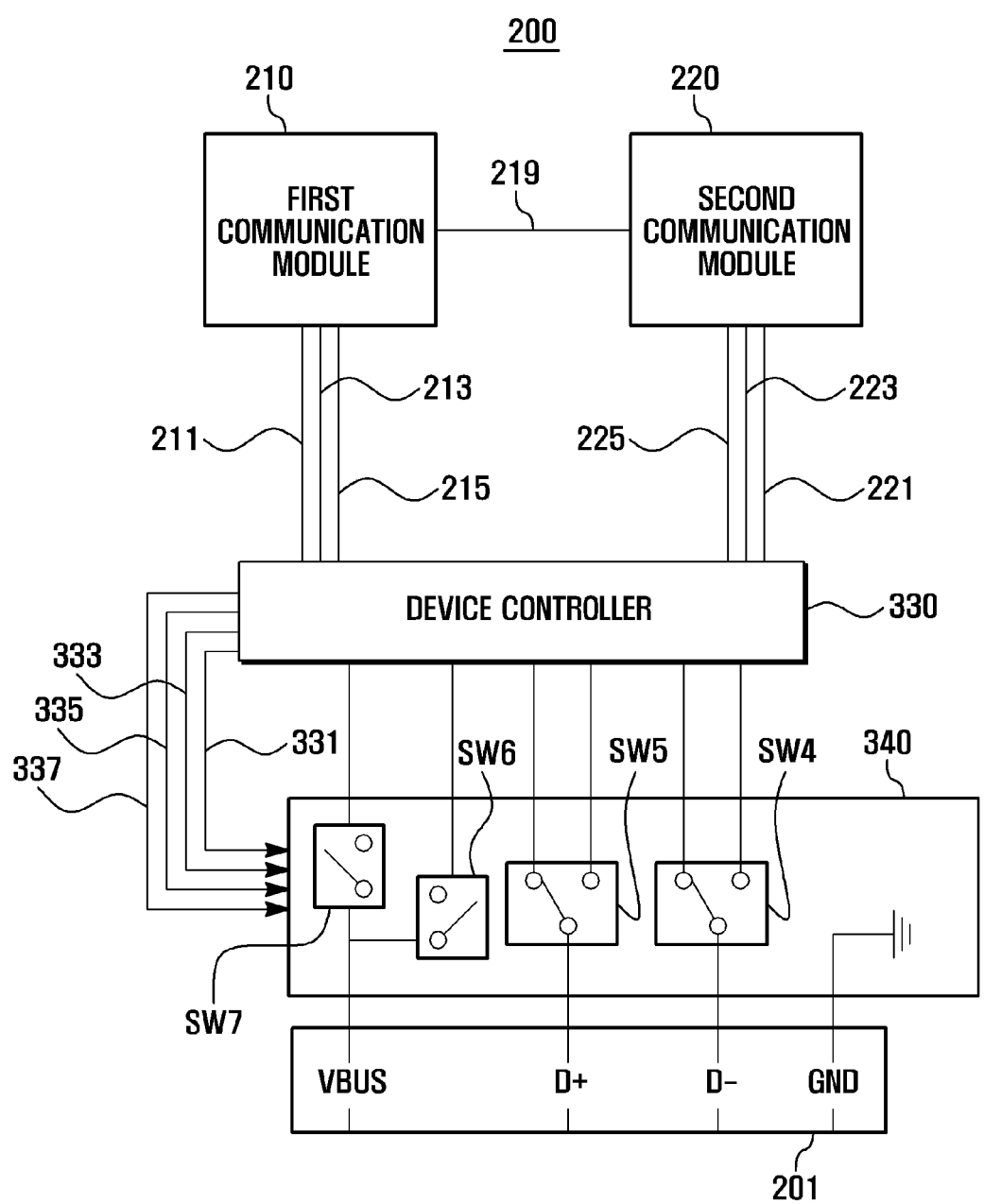
FIG. 6 is a circuit diagram illustrating a simultaneous operation mode of an integral communication device according to an exemplary embodiment of the present invention.

FIG. 6 is a circuit diagram illustrating a simultaneous operation mode of an integral communication device according to an exemplary embodiment of the present invention. In the simultaneous operation mode, one of the two communication modules can be activated while the other communication module maintains its powered on state for collecting information.

Referring to FIG. 6, an integral communication device 200 includes a first communication module 210, a second communication module 220, a device controller 330, a switch 340, and a connector 201. The integral communication device 200 operating in the simultaneous operation mode further includes a first set of lines (including power and signal lines) 211, 213, and 215 connecting the device controller 330 and the first communication module 210, a second set of lines (including power and signal lines) 221, 223, and 225 connecting the device controller 330 and the second communication module 220, a signal line 219 connecting the first and second communication modules 210 and 220 and a fourth set of control lines 331, 333, 335, and 337 connecting the device controller 330 and the switch 340. The switch 340 includes a first switch unit SW4 for switching a first signal terminal (D−) of the connector 201 between the first and second communication modules 210 and 220, a second switch unit SW5 for switching a second signal terminal (D+) of the connector 201 between the first and second communication modules 210 and 220, a third switch unit SW6 for switching a power terminal (VBUS) of the connector 201 between the first and second communication modules 210 and 220, and a fourth switch unit SW7 for switching on and off the power terminal (VBUS) of the connector 201 to the device controller 330. The third and fourth switches SW6 and SW7 operate to control the connection of the power terminal (VBUS) to the first and second communication modules 210 and 220 and interconnection between the first and second communication modules 210 and 220.

The information exchange between the first and second communication modules 210 and 220 can be performed through one of SPI, USART, and USB OTG communications between the control processors of the communication modules 210 and 220. An exemplary operation mode of the integral communication device is describe in more detail with reference to FIG. 7.

FIG. 7 is a timing diagram illustrating an exemplary operation timing of the integral communication device of FIG. 6.

Referring to FIG. 7, once the integral communication device 200 is connected to the mobile terminal 100, it operates in a default operation mode in which the first, second, and fourth switch units SW4, SW5, and SW7 of the switch 340 maintain a high state "H", as shown in period A1. That is, the first, second, and fourth switch units SW4, SW5, and SW7 of the switch 340 connect the first and second signal terminals D− and D+ and power terminal (VBUS) of the connector 201 to the first set of the signal and power lines 211, 213, and 215. The fourth switch (SW7) connects the power terminal (VBUS) of the connector 201 to the power line of the first communication module 201 so as to supply the power from the mobile terminal 100 to the first communication module 210. Accordingly, the first communication module 210 boots up and maintains its high state "H". Here, the high and low states may correspond to the activation and deactivation states of a communication module, respectively. In period A, no power is supplied to the second communication module 220 such that the second communication module maintains its low state "L".

When a control signal requesting activation of the second communication module 220 is received from the mobile terminal 100, the device controller 330 controls the switch 340 such that the first, second, and fourth switch units SW4, SW5, and SW7 are switched to low state "L". At this time, the first and second switch units SW4 and SW5 connect the first and second signal terminals D− and D+ to the signal lines of the second set of lines 221, 223, and 225 of the second communication module 220. Also, the fourth switch unit SW7 switches off the power to the first communication module 210. At the same time, the device controller 330 controls such the third switch SW6 turns to the high state "H". Accordingly, the first communication module 210 is deactivated in the low state "L", while the second communication module 220 is booting up to be activated even in the low state "L" during period B1.

Once the second communication module 220 has completely booted up, the second communication module 220 is turned to the high state "H" as shown in the period B2. At this time, the first, second, and fourth switches SW4, SW5, and SW7 each maintains the low state "L" during period B2 such that the power supply to the first communication module 210 is blocked and thus the first communication module 210 turns to the low state "L".

If a control signal for temporarily activating the second communication module 220 is received from the mobile terminal 100 while the first communication module is activated, the device controller 330 controls such that the first to fourth switch units SW4, SW5, SW6, and SW7 are turned to the high state "H" as shown in period C1. Accordingly, the communication between the second communication module 220 and the mobile terminal 100 is broken but the power supply to the second communication module 220 is maintained such that the second communication module 220 operates independently. For example, in a case that the second communication module 220 is an HSDPA module, the HSDPA module scans frequencies for collecting information on the HSDPA radio environment. Also at this time, the power supply is switched to the first communication module 210 through the fourth switch SW7 such that the first communication module 210 starts booting up.

Once the boot-up process has completed, the first communication module 210 is turned to the high state "H" as shown in the period C2 so as to communicate with the mobile terminal 100 through signal lines connected to the first and second signal terminals D− and D+ of the connector 201. Here, the second communication module 220 transmits the radio environment information collected by its independent operation to the first communication module 210. The first communication module 210 may transmit the radio environment information received from the second communication module to the mobile terminal 100.

Although it is described in this exemplary embodiment that the second communication module 220 collects radio environment information and sends the collected radio environment to the first communication module 210 while the first communication module 210 maintains communication with the mobile terminal 100, the roles of the first and second communication modules 210 ad 220 can be changed.

As described above, an exemplary integral communication device 200 allows the two communication modules to operate individually such that one communication module collects radio environment information while the other communication module communicates with the mobile terminal 100 and transmits the collected radio environment information to the mobile terminal 100.

Although it is described in this exemplary embodiment that, when the integral communication device 200 is connected to the mobile terminal 100, the first communication module 210 is automatically activated as a default communication module, the present invention is not limited thereto. For example, the integral communication device 200 can be configured such that, when connected to the mobile terminal 100, the integral communication device 200 may transmit a listing of the communication modules in order for the mobile terminal to select a communication module from the list. In this case, the device controller of the integral communication device 200 receives a communication module selection signal from the mobile terminal 100 and controls the switch to activate the communication module indicated by the module selection signal.

As described above, an exemplary integral communication device 200 of the present invention establishes signal and power links to the respective communication modules selectively only when it is required for the mobile terminal to communicate with at least one communication module or to collect radio environment information, thereby avoiding unnecessary maintenance of power and signal links between the mobile terminal and the integral communication device and thus improving power utilization efficiency. Also, the integral communication device 200 can be implemented in a compact design with a simple switching mechanism and device controller for controlling the switching mechanism.

Although exemplary embodiments of the present invention have been described hereinabove, it should be clearly understood that many variations and/or modifications of the basic inventive concepts herein taught which may appear to those skilled in the present art will still fall within the spirit and scope of the present invention, as defined in the appended claims.

As described above, an integral communication device and control method thereof according to exemplary embodiments of the present invention enable a simplified device controller to control operations of the multiple communication modules integrated into the integral communication device, thereby implementing the integral communication device in a compact design and improving power utilization efficiency.

What is claimed is:

1. An external integral communication device, the device comprising:
   a plurality of communication modules that operate with different communication standards;
   a connector comprising electric connection terminals for providing electrical connection between the external integral communication device and a mobile terminal;
   a switch for selectively activating electrical connections between the communication modules and the electric connection terminals of the connector; and
   a device controller configured to control the switch to establish electric links from the electric connection terminals to at least one of the communication modules, to exchange signals with the mobile terminal through at least one signal terminal and supply a power received from the mobile terminal through a power terminal to the at least one of the communication modules,
   wherein the terminals for electrical connection comprise:
      at least one signal terminal for establishing a signal link with the mobile terminal;
      the power terminal for supplying the received power to the switch, the device controller, and the at least one of the communication modules selectively when the electric links are established to the at least one of the communication modules; and a ground terminal for grounding the integral communication device.

2. The device of claim 1, wherein the switch comprises:

at least one signal switch unit for connecting a corresponding one of the at least one signal terminal of the connector to a signal line of the at least one of the plurality of communication modules; and a power switch unit for connecting the power terminal of the connector to the at least one of the communication modules.

3. The device of claim 2, wherein the device controller controls each of the at least one signal switch unit and the power switch unit to operate in a first position so that each of the at least one signal switch unit connects to a signal line of a first communication module and the power switch unit provides power to the first communication module.

4. The device of claim 3, wherein the device controller controls each of the at least one signal switch unit and the power switch unit to operate in a second position so that each of the at least one signal switch unit connects to a signal line of a second communication module and the power switch unit provides power to the second communication module, wherein, in the second position, each of the at least one signal switch unit disconnects from the signal line of the first communication module and the power switch unit disconnects from the first communication module.

5. The device of claim 1, wherein the switch comprises:

at least one signal switch unit for switching a corresponding one of the at least one signal terminal of the connector to a signal line of one of the plurality of communication modules; and a plurality of power switch units, each of the power switch units for switching the power terminal of the connector to a corresponding power line of each of the plurality of communication modules.

6. The device of claim 5, wherein the device controller controls each of the at least one signal switch unit to operate in a first position so that each of the at least one signal switch unit connects to a respective signal line of a first communication module, controls a first power switch unit of the plurality of power switch units to operate in a first position to provide power to the first communication module, and controls a second power switch unit of the plurality of power switch units to operate in a second position so that power is not provided to a second communication module.

7. The device of claim 6, wherein the device controller controls to switch the second power switch unit to a first position to provide power to the second communication module.

8. The device of claim 7, wherein the device controller controls to switch each of the at least one signal switch unit to operate in a second position so that each of the at least one signal switch unit connects to a respective signal line of the second communication module and controls the first power switch unit to operate in a second position so that power is not provided to the first communication module.

9. The device of claim 1, wherein the connector comprises a Universal Serial Bus (USB) connector.

10. The device of claim 1, wherein the device controller stores a list of the communication modules and transmits, when the integral communication device connects to the mobile terminal, the list to the mobile terminal.

11. The device of claim 1, wherein the device controller controls, when the integral communication device is connected to the mobile terminal, the switch to establish a communication link with one of the communication modules to the mobile terminal.

12. The device of claim 11, wherein the device controller controls, when a communication module selection signal is received from the mobile terminal, the switch to establish a communication link with the communication module indicated by the communication module selection signal.

13. The device of claim 12, wherein the device controller controls, when a communication module activation signal is received from the mobile terminal, the switch to establish a power link with another communication module indicated by the communication module activation signal while maintaining the previously established communication link.

14. The device of claim 13, further comprising a signal line interconnecting the communication modules for transmitting information collected by the other communication module to the communication module communicating with the mobile terminal.

15. The device of claim 14, wherein the communication module communicating with the mobile terminal receives the information from the other communication module and transmits the information to the mobile terminal.

16. The device of claim 12, wherein the device controller controls, when the communication module selection signal is received from the mobile terminal, the switch to establish a power link and at least one signal link with another communication module indicated by the communication module activation signal and to terminate the previously established communication link.

17. A method for controlling an external integral communication device, comprising multiple communication modules, the method comprising:

establishing an electrical connection between the external integral communication device and a mobile terminal using a connector of the external integral communication device, wherein the connector comprises a connection for a signal line, a power line and a ground line;

controlling a switch of the external integral communication device to supply a power received from the mobile terminal through the power line to a selected at least one communication module;

establishing at least one signal line and at least one power line between a primary communication module selected from the multiple communication modules, selectively set as a default communication module among communication modules in the external integral communication device, and the mobile terminal; and selectively, establishing another power line between a secondary communication module selected from the multiple communication modules except for the primary communication module and the mobile terminal for supplying power from the mobile terminal to the secondary communication module according to signals exchanged between a controller of the switch and the mobile terminal with a supplying of power to the primary communication module.

18. The method of claim 17, further comprising:

activating the secondary communication module;

collecting, at the secondary communication module, information;

delivering the collected information from the secondary communication module to the primary communication module through an electrical connection within the external integral communication device; and transmitting the collected information from the primary communication module to the mobile terminal.

* * * * *